US007746895B2

(12) United States Patent
Bucher et al.

(10) Patent No.: US 7,746,895 B2
(45) Date of Patent: Jun. 29, 2010

(54) GUIDED DISCOVERY OF MEDIA CONTENT

(75) Inventors: Timothy Bucher, Los Altos, CA (US);
Mark A. Ross, San Carlos, CA (US);
Timothy C. Nichols, Los Altos, CA (US)

(73) Assignee: Dell Products L.P., Round Rock, TX (US)

( * ) Notice: Subject to any disclaimer, the term of this patent is extended or adjusted under 35 U.S.C. 154(b) by 901 days.

(21) Appl. No.: 11/193,120

(22) Filed: Jul. 29, 2005

(65) Prior Publication Data

US 2007/0058674 A1  Mar. 15, 2007

(51) Int. Cl.
*H04J 3/22* (2006.01)
(52) U.S. Cl. .................................... 370/468
(58) Field of Classification Search ............... 370/254, 370/259, 351, 468
See application file for complete search history.

(56) References Cited

U.S. PATENT DOCUMENTS

| 5,767,893 | A | 6/1998 | Chen et al. |
| 6,738,779 | B1 | 5/2004 | Yaniv |
| 2001/0001854 | A1 | 5/2001 | Schena et al. |
| 2002/0090936 | A1* | 7/2002 | Sauriol et al. ............... 455/418 |
| 2002/0131404 | A1* | 9/2002 | Mehta et al. ................ 370/352 |
| 2002/0188746 | A1* | 12/2002 | Drosset et al. .............. 709/231 |
| 2003/0018524 | A1 | 1/2003 | Fishman et al. |
| 2003/0027525 | A1* | 2/2003 | Moore et al. .................. 455/41 |
| 2004/0031058 | A1* | 2/2004 | Reisman ..................... 725/112 |
| 2004/0255302 | A1 | 12/2004 | Trossen |
| 2005/0042591 | A1* | 2/2005 | Bloom et al. ........... 434/307 A |
| 2005/0055721 | A1 | 3/2005 | Zigmond et al. |
| 2006/0023642 | A1* | 2/2006 | Roskowski et al. ......... 370/254 |
| 2007/0174467 | A1* | 7/2007 | Ballou et al. ................ 709/227 |

FOREIGN PATENT DOCUMENTS

CN       1408178       4/2003

OTHER PUBLICATIONS

Schuehler D.V. et al. "Architecture for a Hardware-Based, TCP/IP Content-Processing System" Micro, IEEE, vol. 24, Issue 1, Jan.-Feb. 2004 pp. 62-69.

* cited by examiner

*Primary Examiner*—Dang T Ton
*Assistant Examiner*—Nourali Mansoury
(74) *Attorney, Agent, or Firm*—Workman Nydegger

(57) ABSTRACT

Guided discovery of content in a device. A device such as a satellite radio can received multiple data streams at least over networks including a satellite network or other wireless networks. The device includes filters that are based on the history of the device, the advertising history of the device, or on lists obtained from other devices. The data streams available to the device are filtered using the filters to discover content in the data streams. Content, including metadata or a portion of the content itself, discovered by the results of the filters can be stored at the device. The device notifies the user of the discovered content. The filters guide the discovery of content that may be of interest to the user of the device.

20 Claims, 2 Drawing Sheets

GUIDED DISCOVERY OF MEDIA CONTENT

CROSS-REFERENCE TO RELATED APPLICATIONS

Not applicable.

BACKGROUND OF THE INVENTION

1. The Field of the Invention

The present invention relates to discovering content received by a device. More particularly, embodiments of the invention relate to the guided discovery of media content on media streams available to portable audio devices.

2. The Relevant Technology

Digital media comes in a variety of different formats and can be enjoyed on a wide variety of devices. Many of these devices, such as digital audio devices (e.g., MP3 players), CD players, DVD players, notebook computers, cellular telephones, and personal digital assistants, are portable devices with wireless capabilities. The growth in portable device technology corresponds with a growth in wireless network technology and the ability to distribute digital media. As a result, digital media can received over wireless networks that include, for example, IP based networks, radio networks, cellular networks, and WiFi networks.

Digital media can also be received over satellite radio networks. In satellite radio, satellites broadcast digital radio content to subscribers. Through satellite radio, subscribers can receive high quality, uninterrupted, digital media content such as radio over more than one hundred different radio channels. The digital media transmitted over satellite radio can include, by way of example, digital quality music, talk radio, sports, news, weather, and the like. Often, in order to take advantage of the content offered over satellite radio networks, a user of satellite radio needs a portable device that can receive and ultimately play or perform the digital media content.

One of the goals the media content providers want to achieve is enabling users to discover new content because the discovery of new content correlates with revenue growth. There are several tools that currently exist and that are used to help a user discover content. For example, users that purchase songs from a website can provide the website with certain preferences that help the website suggest songs that the user may want to purchase. When a user indicates that he or she prefers a certain genre, then artists included in that genre may be presented to the user. When a user identifies a particular artist, the website can present similar artists to the user. The website uses these preferences to minimize the searching that the user performs as well as to encourage the sale of the new content. Using user preferences to suggest songs is often successful because users are more likely to purchase content if they have some assurance that it is similar to content with which they are familiar.

While websites can attempt to discover content for a user, this type of discovery is limited to existing content or to content that is stored by the website. However, the website cannot currently discover content in data streams that a device is capable of receiving. The website, for example, may compare the information provided by the user with information stored in its own databases to identify media content that could be recommended to the user. In contrast, content provided over satellite radio, for example, cannot be discovered in the same way as content existing on the storage of a website. Even though the website may be aware of the user's preferences, the website is unable to discover content that is delivered over satellite radio networks.

Conventional satellite radios do not have the ability to discover content in data streams available to the satellite radios. For example, a satellite radio can receive multiple channels of content over a satellite network and a user is free to discover content by changing channels. The satellite network, however, is unable to recommend another channel or specific content on another channel to the user.

One of the difficulties in automating the discovery of content delivered to a device over a satellite network as a data stream is that the content cannot be searched like the database of a website because satellite communication is unidirectional. Thus, a query for specific content cannot be delivered to the source of the content and the content cannot, therefore, be searched like the content of a website. As a result, content is conventionally discovered by simply changing channels. The device itself cannot currently guide the discovery of content on the device.

BRIEF SUMMARY OF THE INVENTION

These and other limitations are overcome by embodiments of the present invention, which relates to systems and methods for discovering content in the data streams available to a device and more particularly to guiding the discovery of content in the data streams available to a device.

In one embodiment, a device such as a satellite radio receives multiple data streams including digital radio channels over a satellite network or content over other network such as a wireless IP based network. The device filters some or all of the data streams using filters to discover content. Content discovered in this manner is guided in that it is based on the filters. The discovered content can be stored or metadata associated with the content can be stored and a user is notified of the discovered content.

In one embodiment, a device receives content from multiple data streams and the method for discovering content in the data streams, including the data streams not being performed by the device, begins by receiving the data streams. Content is discovered using filters and the discovered content is stored at the device. For example, the metadata or at least a portion of the discovered content is recorded and the user of the device can then be notified of the discovered content. The content can be discovered without querying the source of the content in one example.

In another embodiment, in a system that delivers radio content using a satellite network, a method for discovering content in the one or more channels that are not being performed by a device receives channels that are available to the device. The channels available to the device may be from networks other than the satellite network in one example. The channels available to the device are process with filters that may include the history of the device and lists from other devices. This enables a user to discover content that may be of interest to another user. The discovered content is then based on the results of the filters. The filters can be dynamically updated or manually updated to focus the filters for specific content. The user is then notified by the device of the discovered content in the channels. The content itself, and/or metadata identifying the content can be stored or recorded by the device. In one example, the recorded content can be purchased automatically.

Additional features of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
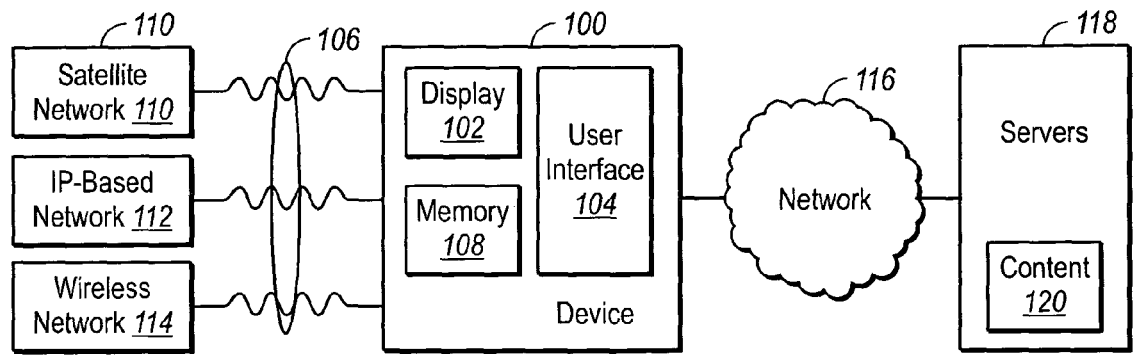
FIG. 1 illustrates an exemplary environment for implementing embodiments of the invention.

Embodiments of the invention relate to discovering content and more specifically to guiding the discovery of content that is delivered to a device as a data stream. For example, a satellite radio is a portable audio device that has the ability to receive content including digital media from a satellite network as a data stream. The device can interpret and then perform the received digital media. Advantageously, satellite radio typically includes multiple channels and the content on those channels that is available to a user is quite large. As previously indicated, the guided discovery of this content is difficult in part because satellite transmissions are unidirectional from the perspective of the device.

Thus, the media content delivered through satellite radio networks is active in the sense that the user does not necessarily know what is going to be played next or even what is playing on other channels without manually changing to those channels. Although certain channels may be devoted to a particular theme or type of content (e.g., sports radio, weather, jazz, etc.), the user is still unaware of the specific content that is going to be delivered over the satellite network on those channels.

Even though a subscriber to satellite radio can continually receive "new" or "fresh" content over multiple channels, the same subscriber can only discover that content by manually switching through the multiple channels. Embodiments of the invention guide the discovery of content delivered to a device over a data stream and enables the automated discovery of content in the data streams. Advantageously, embodiments of the invention can then recommend content on another channel to a user even though the device cannot query the source of the content and without requiring the user to manually switch through the available data streams or channels.

Although embodiments of the invention are discussed with reference to satellite radio, one of skill in the art can appreciate that embodiments of the invention can be applied to other networks (wired and/or wireless) over which content is delivered. Cellular networks, IP based networks, WiFi networks, Bluetooth networks, and the like or any combination thereof are examples of networks over which the discovery of content can occur.

Embodiments of the invention enable a satellite radio to filter the new content that is being received to identify specific content or certain channels or data streams that may be of interest to the user or that may not be of interest to the user. The user of the satellite radio (or other portable device) can then be guided to content of interest more quickly than manually scanning through the channels available to the device. Further, the content can be purchased with little or no overhead required of the user as described in co-pending United States patent application filed on the same day as the present application, and entitled "Automated Acquisition of Discovered Content", which is hereby incorporated by reference. Embodiments of the invention can apply to situations where the user acquires permanent rights to the content as well as to situations where the user rents or temporarily accesses the content. Embodiment of the invention generally apply to situations where the user obtains permanent rights to the content as well as to situations where the rights of the user are temporary.

FIG. 1 depicts an exemplary environment for implementing embodiments of the invention and illustrates one embodiment of a device that can receive content (also referred to herein as data streams) including digital media from one or more sources. In this example, the device 100 is representative of both portable and non-portable devices that can receive content 106 that may include digital audio and/or digital video data. Examples of the device 100 may include, by way of example, a satellite radio device, a portable audio player (e.g., an MP3 player), a portable DVD or CD player, a personal computer, a laptop computer, a cellular telephone, a personal digital assistant, and the like or any combination thereof.

Typically, the device 100 includes a display 102 that can convey information to the user of the device regarding the content stored on the device 100 or being performed by the device 100. For example, when the device 100 performs digital audio data, the display 102 may convey the song title, the name of the artist, the album title, the track number, the length of the track, and the like or any combination thereof. The device 100 also includes a user interface 104 (such as control buttons) or other means of providing input to the device 100. The user interface 104, by way of example, enables a user to navigate and perform the digital media that is stored on the memory 108 of the device 100 or to navigate and perform any content or data stream that is received from an external source. The user interface 104 may also enable a user to switch to another channel such as in satellite radio.

The content 106 represents different types of media or data streams including digital media that may be received by the device 100. Examples of the content 106 include, but are not limited to, digital music, talk audio data, television data, movie data, podcasts, sports data, and the like or any combination thereof. The content 106 can be either digital or analog in nature. The content 106 can be delivered as a data stream. Each data stream may be a channel or may include multiple channels. In this example, the device 100 may be able to receive content generated by various content providers over one or more of a satellite network 110, an IP based network 112 (wireless and/or wired), or another wireless network 114 such as a cellular network or a terrestrial network or a computer based network. For example, a satellite radio device typically receives content from a satellite network, although the satellite radio device may also be configured to connect with and receive content over other networks or from other content providers.

The memory 108 of the device can be used to store content or other user and/or device data. The memory 108 can also be used to record content that is received from the content providers or obtained from another source. The memory 108, for example, may store digital music and/or video, graphics, playlists, user preferences, device settings, and the like or any combination thereof. The device 100 may also be able to communicate with servers 118 over a network 116. In some instances, the network 116 may be the same networks over which the content 106 is received. In one example, content 120 may be purchased from the servers 118.

While the content 106 is similar to the content 120 (e.g., both the content 106 and the content 120 may be the same content) in one embodiment, the content 106 may be temporally limited from the perspective of the device because it is being received in a data stream. The content 120, on the other hand, is not temporally limited because it can be examined and/or accessed at any time by the device 100. The ability of the device 100 to examine the content 106 is limited at least by time.

Figure 2:
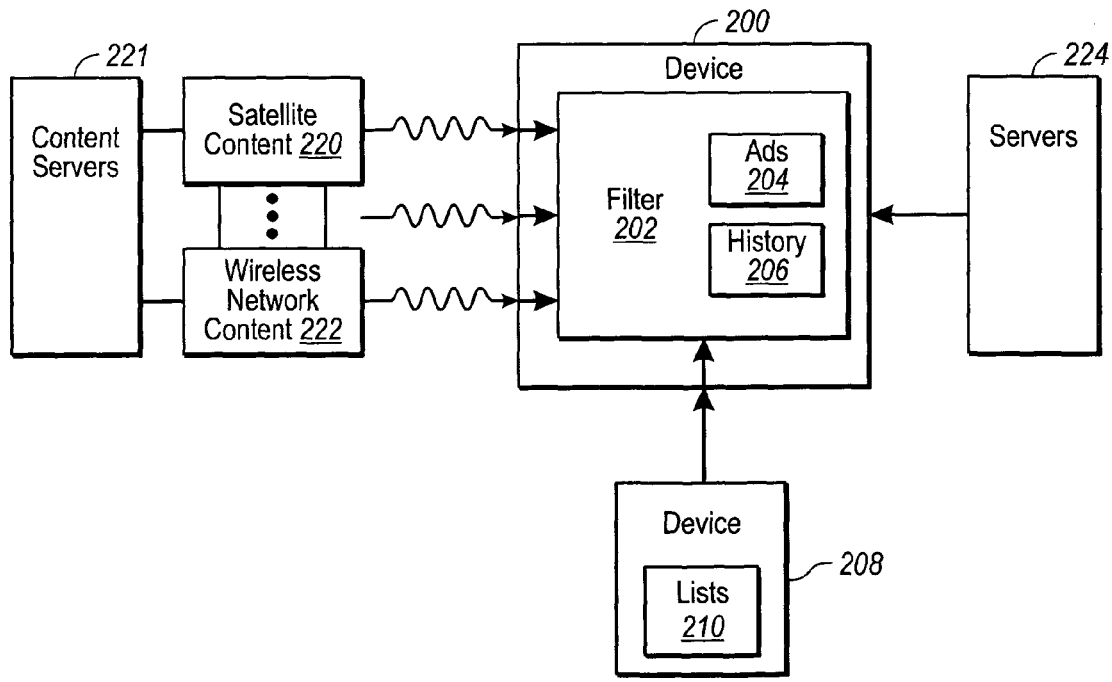
FIG. 2 illustrates one embodiment of a device that can filter or guide the discovery of content that is available to the device.

FIG. 2 illustrates an exemplary device that, in accordance with embodiments of the invention, filters or guides the discovery of content received by the device. The device 200, which is one embodiment of the device 100, is able to receive content from at least one content provider 221. In this example, the device 200 receives satellite content 220 from a satellite content provider and/or content 222 from a content provider over a wireless network such as an 802.11 based network, a cellular or other RF network, or an IP based or other computer based network. The content 220 and 222 includes new content in the sense that it is actively being delivered to the device 200.

The device 200 uses filters 202 to discover the content received from the content sources 221. As previously indicated, the satellite content 220 typically includes multiple channels and the device 200 is typically able to perform a single channel for the user at a time. Even if the device 200 could perform more than one channel, people cannot effectively listen to two channels simultaneously. As a result of this limitation, the content on the remaining channels of the satellite content 220 remains effectively undiscovered. Unlike the content 120 that may be available from the servers 118 (such as the songs available from websites), the satellite content 220 is changing with time. Thus, the ability of the device 200 to discover the satellite content 220 is limited at least by time. In this example, discovering content includes, but is not limited to, identifying content that may be interesting to the user of the device 200.

The filters 202 of the device 200 have the ability to examine some or all of the channels in the satellite content 220 as well as the network content 222 even though the user may be listening to a particular channel. When the filters 202 find content that may be of interest to the user on another data stream or channel, the discovered content can be stored (e.g., recorded) in memory of the device 200. In one embodiment, the metadata that uniquely identifies the discovered content is stored. In another embodiment, the content is recorded in memory either partially or completely or a signature representing the content is stored. In another example, the user may be notified (on the display of the device, for example) that there is content on another channel that may be of interest to the user. Thus, the device uses the filters 202 to process or to search through the content available to the device in order to identify content in accordance with the filters 202.

The filters 202 are typically constructed to search through the type of data that is available over the data stream. Searching the data can include comparing the data with other data. For example, a data stream delivering audio data typically includes the audio data itself along with other metadata describing the audio data. In addition to describing or uniquely identifying the audio data, the metadata may also include information identifying future audio data as well as a history of previously delivered audio data. The metadata can be searched using criteria in the filters 202 or compared to metadata of the filters 202, the audio data can be compared to other clips in the filters 202, and the like or any combination thereof in order to discover content. Thus, the filters 202 can automate the discovery of content for the user of the device 200 on other channels of content that are available to the device 200.

In one example, the filters 202 used to discover the content 220 and 222 can be created using input or data from various sources. The filters 202 can also be dynamic in nature or static. Thus, the filters 202 can be updated over time with new criteria or updated lists or they can remain unchanged. Specific filters can be added and/or removed to focus the filters 202 on specific content in the data streams available to the device 200.

One source of input or data used to create or develop the filters 202 is the history 206 of the device 200. The history 206 of the device can include information about content that has previously played on the device, information regarding content that has been recorded on the device 200, information regarding content that has been purchased or accessed from a remote server 224, metadata regarding content played or stored by the device, information regarding content currently stored on the device or on a computer that the device can connect with, metadata associated with songs or content actually performed by the device, and the like or any combination thereof.

Similarly, the ads 204 that a user has viewed on the device 200 can serve as a source of input for the filters 202. For example, if the history 206 indicates that the user typically listens to audio data from a particular artist, or to music from a certain time period, then the filters 202 search the data streams available to the device to identify content that is by that particular artist or from that certain time period. Any content discovered by the filters can be stored temporarily or permanently. The user may also be notified immediately or at a later time. The user has the ability to listen to the recorded content or at least view the metadata regarding the discovered content. The user may also have the option of purchasing the discovered content.

Another source of information used in the filters 202 can be obtained from other devices such as the device 208. In other words, community information can be used in or by the filters 202. In this example, the device 208 includes various lists 210, which include the history of the device 208, the ads 204 that have been viewed on the device 208, play lists, metadata, and the like or any combination thereof.

This enables the user of the device 200, for example, to experience and discover content that the user of the device 208 may enjoy. The lists 210 can be input to the device 200 manually or transmitted from the device 208 to the device 200 directly using an appropriate link (e.g., infrared, cable, etc.). The lists 210 associated with the device 208 may also be obtained from the server 224 in another example.

The various sources including, but not limited to the lists 210, history 206, and ads 204 that are used to generate the filters can then be used to guide the user to specific media or content that may be available on the satellite content 220, and/or the network content 222. Filters 202 can also be created by the user rather than generated automatically by the device 200.

Figure 3:
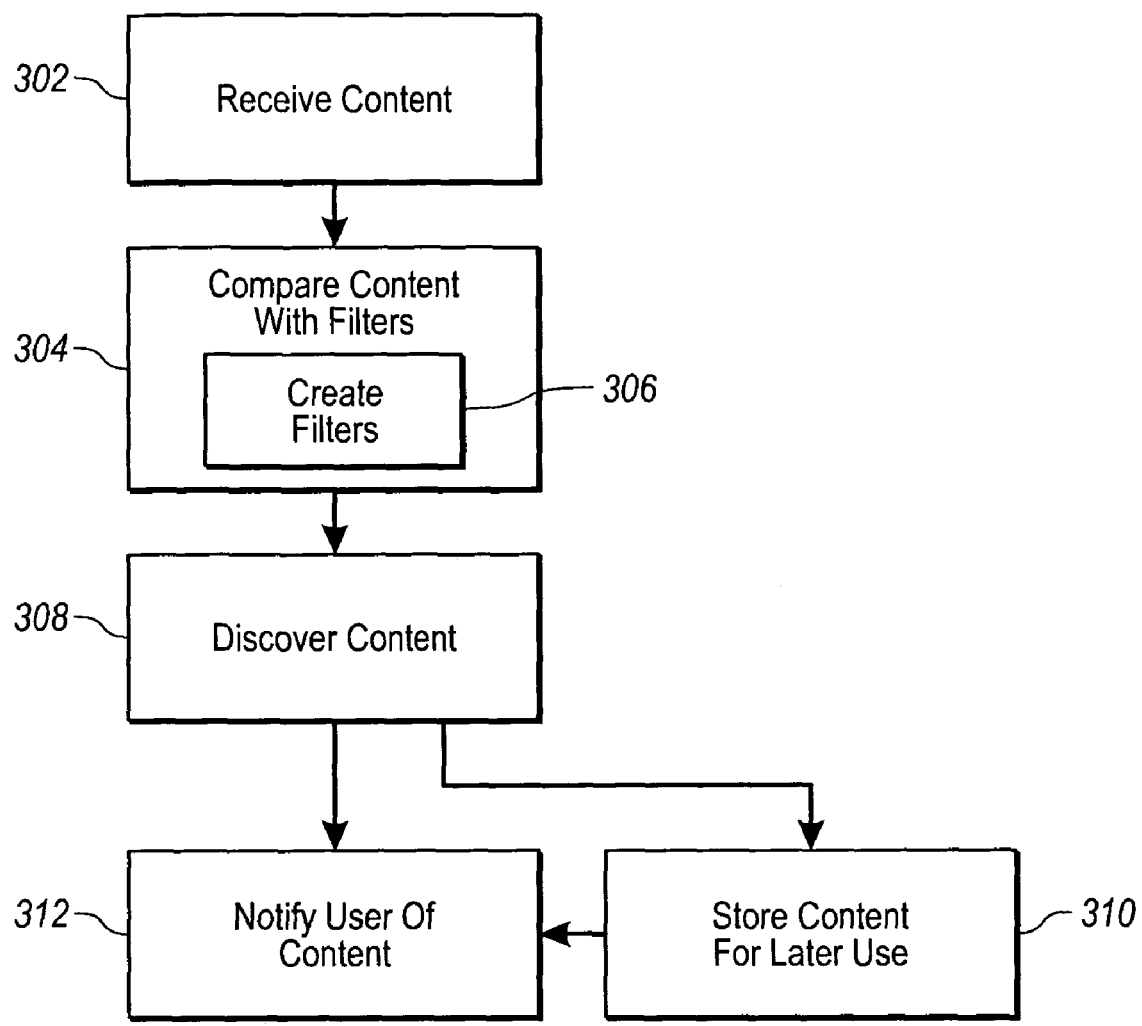
FIG. 3 illustrates an exemplary flow diagram for guiding the discovery of content in data streams available to a device.

FIG. 3 illustrates an exemplary flow diagram for guiding the discovery of content available to a device. The method 300 illustrates a method for a device to automate the process of discovering content for a user. A device first receives content 302 from one or more sources. In one example, the content may be available over a satellite network, a wireless computer network or IP based network, a cellular network, and the like or any combination thereof. Some of these networks may be unidirectional from the perspective of the device. A device can therefore be capable of receiving multiple channels or data streams simultaneously.

Next, the device compares or processes the content with filters 304. This can include creating the filters 306. In one embodiment, the filters are created automatically based on information maintained by the device such as the device histories and other lists. The filters can also be created using other devices in a community. These devices can exchange information automatically when in range. Alternatively, the lists from one device can be uploaded to another device and used in the filters.

The device discovers content 308 with the results of the comparisons or processing performed using the filters. Content from one or more channels that satisfy the requirements of the filters can be stored 310 for later use. This may include storing the metadata of the content, a portion of the content, all of the content, and the like. While storing the content, after storing the content, or without storing the content, the device typically notifies 312 the user of the discovered content.

The notification of discovered content is typically conveyed using the display of the device. An icon, for example, can be generated and displayed to the user or the metadata can be displayed to the user. If the discovered content is of low quality or if the user wants to secure rights to the content, the device can automate the process of securing a high quality version of the content as well as rights to perform the content.

Embodiments within the scope of the present invention also include computer-readable media for carrying or having computer-executable instructions or data structures stored thereon for performing embodiments of the invention. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a system including a device that receives a plurality of data streams from one or more data stream sources, a method comprising:

receiving the plurality of data streams broadcast over a satellite radio network at the device, the data streams comprising content data segments comprising: audio data; and metadata identifying one or more characteristics of the audio data;

performing at least a portion of a first audio data of one of the data streams at the device, the performing comprising converting the audio data into sound perceptible by a user; and discovering, at the device, a content data segment of a second one of the data streams that is not being performed, wherein the discovering comprises filtering, with a filter, the second one of the data streams currently received at the device, wherein the filter is created automatically based at least in part on a history of the device and on a list received from a second device, the list including the history of the second device, a play list of the second device, user preferences of the second device and ads that have been viewed by the second device;

wherein the filtering comprises:
    a comparison of the audio data of an unperformed content data segment of the second data stream to other audio data;
    a search of the metadata of the unperformed content data segment of the second data stream for certain filter criteria; and a comparison of the metadata of the unperformed content data segment of the second data stream to other metadata.

2. The method as defined in claim 1, further comprising receiving a plurality of data streams from an IP based wireless network.

3. The method as defined in claim 2, wherein the plurality of data streams from the IP based wireless network comprise one or more channels of digital radio media content.

4. The method as defined in claim 1, wherein the discovering comprises filtering a portion of the data streams using one or more of the history of the device and an ad history of the device.

5. The method as defined in claim 1, wherein the discovering comprises comparing metadata in one or more data streams with metadata in the filter.

6. The method as defined in claim 1, further comprising notifying a user of a device of the discovered content, wherein the discovered content is in a data stream that the device is not performing.

7. The method as defined in claim 1, further comprising one or more of
automatically purchasing a discovered content; and
renting the discovered content.

8. The method as defined in claim 1, further comprising one or more of
permanently acquiring rights to a discovered content; or
temporarily acquiring rights to the discovered content.

9. The method as defined in claim 1, further comprising storing a discovered content at the device by performing one or more of
storing metadata of the discovered content in memory of the device; and
recording at least a portion of the discovered content in the memory of the device.

10. The method as defined in claim 1, further comprising updating the filter dynamically based on at least one of the history of the device and a list from another device.

11. The method as defined in claim 10, further comprising manually updating the filter to focus the filter on specific content to be discovered in the one or more data streams.

12. In a system that delivers radio content using a satellite network, a method comprising:
receiving a plurality of channels broadcast over the satellite radio network at a first device, each of the channels carrying content data segments comprising:
audio data; and
metadata identifying one or more characteristics of the audio data;
performing at least part of a first audio data from a first one of the channels at the first device, the performing comprising converting the first audio data to sound that is perceptible by a user;
processing two or more unperformed content data segments of the received channels at the first device, the processing comprising filtering the content data segments currently received at the device with a filter at the first device, wherein the processing is based at least in part on one or more of a performance history and a list from a second device, the list including the history of the second device, a play list of the second device, user preferences of the second device and ads that have been viewed by the second device, the filtering comprising:

a comparison of the audio data of the two or more unperformed content data segments to other audio data;
a search of the metadata of the two or more unperformed content data segments for certain criteria; or
a comparison of the metadata of the two or more unperformed content data segments to other metadata;
discovering content included in the second one of the received channels based on a result of the processing; and
notifying a user of the discovered content.

13. The method as defined in claim 12, further comprising receiving additional channels over a separate wireless network.

14. The method as defined in claim 13, wherein the separate wireless network is an IP based network.

15. The method as defined in claim 12, wherein the discovered content is on a channel not being performed by the first device.

16. The method as defined in claim 12, further comprising storing the discovered content in memory of the first device.

17. The method as defined in claim 16, wherein storing the discovered content further comprises one or more of
storing metadata associated with the discovered content; and
recording at least a portion of the discovered content.

18. The method as defined in claim 1, wherein the filter is created automatically based on information maintained by the device.

19. The method as defined in claim 11, further comprising recommending content on another channel to the user.

20. A performance device comprising:
a memory configured to store content;
a user interface responsive to a user input so as to enable a user to cause the performance device to perform a portion of audio content stored in the memory;
a data link receptive to a plurality of data streams that each include content data segments comprising audio data and metadata identifying one or more characteristics of the audio data, the data link being arranged for communication with the memory;
filters configured to identify content data segments currently received at the device according to a set of criteria that is related to one of a performance history of the performance device, an ad viewing history of the performance device, and community information, the community information including the history of a second device, a play list of the second device, user preferences of the second device and ads that have been viewed by the second device; and
a display configured to present information regarding content stored in the memory, the information including a content title, the display further configured to notify the user that the filters have identified content,
wherein the filters perform:
a comparison of the audio data of an unperformed content data segment of the plurality of data streams to other audio data;
a search of the metadata of the unperformed content data segment of the plurality of data streams for certain filter criteria; and
a comparison of the metadata of the unperformed content data segment of the plurality of data streams to other metadata.

* * * * *

UNITED STATES PATENT AND TRADEMARK OFFICE
CERTIFICATE OF CORRECTION

PATENT NO. : 7,746,895 B2
APPLICATION NO. : 11/193120
DATED : June 29, 2010
INVENTOR(S) : Timothy Bucher et al.

Page 1 of 1

It is certified that error appears in the above-identified patent and that said Letters Patent is hereby corrected as shown below:

In Column 9, Line 18, in Claim 6, delete "a device" and insert -- the device --, therefor.
In Column 9, Line 18, in Claim 6, delete "the discovered" and insert -- a discovered --, therefor.
In Column 9, Line 22, in Claim 7, delete "of" and insert -- of: --, therefor.
In Column 9, Line 26, in Claim 8, delete "of" and insert -- of: --, therefor.
In Column 9, Line 32, in Claim 9, delete "of" and insert -- of: --, therefor.
In Column 10, Line 22, in Claim 17, delete "of" and insert -- of: --, therefor.

Signed and Sealed this

Fourteenth Day of September, 2010

David J. Kappos
*Director of the United States Patent and Trademark Office*